INVENTOR.
EMANUEL A. WINSTON

United States Patent Office 3,484,105
Patented Dec. 16, 1969

3,484,105
KINESTHETIC IDENTIFICATION GAME
APPARATUS
Emanuel A. Winston, Chicago, Ill., assignor to Marvin
Glass and Associates, Chicago, Ill., a limited partnership
Filed Oct. 12, 1966, Ser. No. 586,139
Int. Cl. A63f 9/00
U.S. Cl. 273—1                            2 Claims

ABSTRACT OF THE DISCLOSURE

A game in which three-dimensional objects are identified by touch and selected to match a visual illustration of the object. The game is played by placing the objects in an opaque box with apertures for receiving a player's hands which identify and select the objects in response to a visual illustration of the object on a playing card.

---

This invention relates to a game device and, in particular, to a game device which in addition to being a toy is an excellent teaching and testing vehicle.

The game device of the present invention is a learning-to-learning game, in that it is a motivational resource for reading readiness and also helps to develop motor perceptual skills. The latter is a result of building spacial and form concepts through kinesthetic-visual matching. Most children enjoy the game device as a toy since they can play it by themselves or with other children. Furthermore, it is challenging to them, and when played with others, it arouses their competitive spirit.

The game device also makes an excellent teaching vehicle since children learn to recognize different shapes and configurations, both visually and by touch, in using it. Conversely, it can be used to test a child's ability to recognize and to identify differently shaped objects.

It is an object of the present invention to provide an improved game device which is functional both as a toy and as a teaching and testing vehicle.

Another object is to provide a game device which can be easily and inexpensively manufactured.

Still another object is to provide a game device which is a motivational resource for reading readiness.

Another object is to provide a game device which can be used to develop motor perceptual skills, by building spacial and form concepts through kinesthetic-visual matching.

Other objects of the invention will in part be obvious and will in part appear hereinafter.

The above objectives are accomplished with a game device which includes, generally, a box-like structure having a number of hand-holes formed in its side walls, a number of differently shaped three-dimensional objects, and a number of playing cards which have illustrations on them, corresponding to the shapes of the objects. The objects are placed inside the box-like structure, and the players feel the objects to find the one corresponding to the illustration on the playing card which is exposed to their view. The rules of play can be varied, to adapt the game device to a toy, or a teaching and testing vehicle.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing in which.

Similar reference characters refer to similar parts throughout the several views of the drawing.

Figure 1:
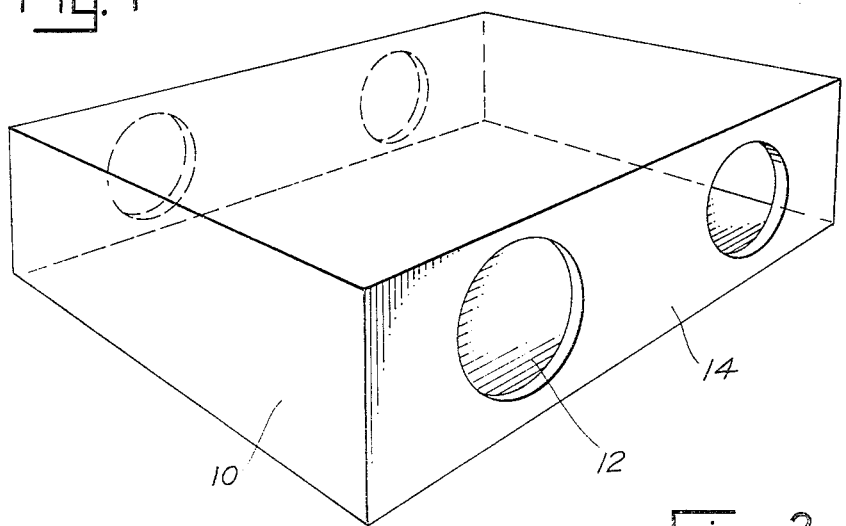
FIG. 1 is a perspective view of the container in which the differently saped three-dimensional objects are placed.
Figure 2:
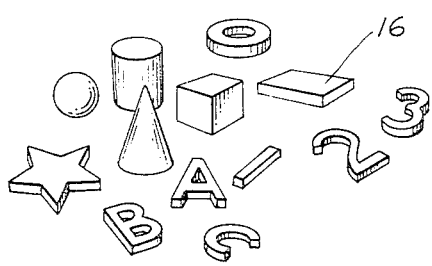
FIG. 2 is a perspective view of a number of the differently shaped three-dimensional objects which can be used.
Figure 3:
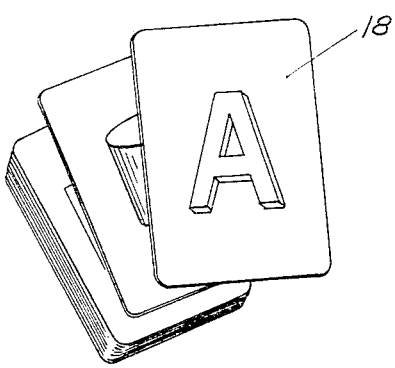
FIG. 3 is a perspective view of the playing cards having illustrations corresponding to the three-dimensional objects thereon.
Figure 4:
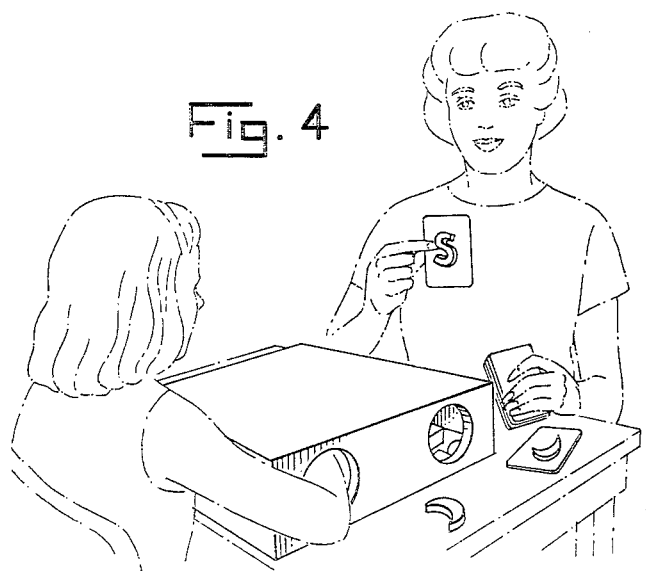
FIG. 4 is a view generally illustrating the manner in which the game device is used.

Referring now to the drawing, the game device of the present invention is illustrated including a closed box-like container 10 having apertures 12 formed in one or more of its side walls 14, a number of differently shaped three-dimensional objects 16, and a number of playing cards 18, each of which has an illustration corresponding to one of the three-dimensional object on it.

The game device can be used as a toy, by placing the three-dimensional objects 16 loose in the container 10. The players then try to find an object corresponding to the illustration on a playing card 18, when the latter is exposed, by feeling the objects inside the container. Whoever pulls the right object out first scores a point. If the wrong object is selected, one point is lost. The player scoring the most points when all of the playing cards 18 are exposed is the winner. The above rules of play can, of course, be varied and the manner of play outlined above is merely intended to illustrate one manner in which the game device can be played.

The number of players is limited only by the number of apertures 12 formed in the container 10, and the number of apertures is generally dictated by the size of the container. Accordingly, more players can be accommodated if the container is made large since a larger number of apertures can be formed in it. Also, the number of three-dimensional objects 16 provided can be varied, depending in part upon the size of the container 10. The size of the container and the number of objects provided should be proportioned so that a number of players can each get one of their hands into the container and has sufficient freedom to move their hands about inside the container to find a particular shaped object. There should be a playing card 18 for each of the objects, however, less than all of the playing cards can be used in a game, if desired. In this way, not all of the objects will be removed so that the players, on each turn of a playing card, must feel the objects to determine the correct one to be removed.

As indicated above, most children find the game device amusing and exciting since they can play it by themselves and with other children. Furthermore, in playing the game, they learn to recognize, compare and match different objects so that their motor perceptual skills are developed. Accordingly, they can learn while amusing themselves.

Teachers also find that the game device can be used for educational and testing purposes, to teach and to test the ability of children to recognize various shapes. It is particularly useful in working with mentally retarded children, since it is both an amusing and instructive device.

The container 10 can be of almost any shape which can be used in the manner described above, but it preferably has a rectangular shape, as illustrated, or other polygonal shape. The container 10 can be fabricated of a heavy-weight paper board or cardboard having sufficient strength and rigidity to withstand some degree of abuse. If the game device is intended to be primarily used for educational or testing purposes, it may be desirable to fabricate the container 10 of a stronger or sturdier material such as plastic, metal or wood. If plastic is used, it of course should be opaque.

The differently shaped three-dimensional objects 16 can be cubes, rectangles, pyramids, cylinders, letters, numbers and can be fabricated of most any type of material, including but not limited to those materials mentioned above of which the container 10 can be fabricated. As in the case of the container 10, the particular material used is largely dependent upon the primary use intended for the game device, whether a toy or an educational device.

The playing cards are preferably fabricated of paper board or the like and may be plastic-coated, if desired, like most ordinary playing cards are today. Other materials can be used also.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A game device comprising an enclosed container of polygonal shape and having a plurality of apertures therein for placing hands inside of it, whereby a number of players corresponding to the number of said apertures can play said game device, a plurality of differently shaped three-dimensional objects loosely and removably disposed within said container, and means having illustrations thereon corresponding to and identifying three-dimensional objects to be removed from said container whereby one of said objects is selected and removed from said container solely by kinesthetic identification in response to said illustration means.

2. The game device of claim 1, wherein said means having illustrations thereon comprises a plurality of playing cards, each having an illustration thereon corresponding to and identifying a three-dimensional object to be removed from said container.

References Cited

UNITED STATES PATENTS

| 3,390,469 | 7/1968 | Rader | 273—1 XR |
| 2,659,163 | 11/1953 | Albee. | |
| 2,729,020 | 1/1956 | Frampton | 35—22 X |
| 3,235,263 | 2/1966 | Smith | 35—69 X |
| 3,295,252 | 1/1967 | Willette | 272—1 X |

RICHARD C. PINKHAM, Primary Examiner

PAUL E. SHAPIRO, Assistant Examiner

U.S. Cl. X.R.

35—22, 72